United States Patent [19]

Mori et al.

[11] Patent Number: 4,748,326

[45] Date of Patent: May 31, 1988

[54] RADIATION IMAGE READ-OUT APPARATUS

[75] Inventors: Nobufumi Mori; Shigeru Saotome; Hideo Watanabe; Kazuo Shimura, all of Kanagawa, Japan

[73] Assignee: Fuji Photo Film Co., Ltd., Kanagawa, Japan

[21] Appl. No.: 947,220

[22] Filed: Dec. 29, 1986

[30] Foreign Application Priority Data

Dec. 27, 1985 [JP] Japan .................... 60-299848

[51] Int. Cl.$^4$ ............................... G03C 5/16
[52] U.S. Cl. ..................... 250/327.2; 250/484.1
[58] Field of Search ............... 250/327.2, 484.1, 347

[56] References Cited

U.S. PATENT DOCUMENTS 4,527,061 7/1985 Horikawa et al. ............ 250/327.2

Primary Examiner—Carolyn E. Fields
Attorney, Agent, or Firm—Sughrue, Mion, Zinn, Macpeak & Seas

[57] ABSTRACT

A radiation image read-out apparatus is constituted for scanning a stimulable phosphor sheet carrying a radiation image stored thereon with a beam of stimulating rays which cause the stimulable phosphor sheet to emit light in proportion to the stored radiation energy, and photoelectrically detecting the light emitted by a stimulable phosphor sheet portion scanned with the beam of stimulating rays by use of a photodetector to obtain an image signal. The radiation image read-out apparatus is constituted so that the beam diameter of the beam of stimulating rays is adjusted to be smaller than a picture element size and each of picture elements is scanned by a plurality of scanning passes with the beam of stimulating rays. An addition device is provided for adding a plurality of image signals per picture element obtained by the plurality of scanning passes.

6 Claims, 2 Drawing Sheets

RADIATION IMAGE READ-OUT APPARATUS

BACKGROUND OF THE INVENTION

1. Field of the Invention

This invention relates to a radiation image read-out apparatus for reading out a radiation image stored on a stimulable phosphor sheet by exposing the stimulable phosphor sheet to stimulating rays which cause it to emit light in proportion to the stored radiation energy, and photoelectrically detecting the emitted light.

2. Description of the Prior Art

When certain kinds of phosphors are exposed to a radiation such as X-rays, $\alpha$-rays, $\beta$-rays, $\gamma$-rays, cathode rays or ultraviolet rays, they store a part of the energy of the radiation. Then, when the phosphor which has been exposed to the radiation is exposed to stimulating rays such as visible light, light is emitted by the phosphor in proportion to the stored energy of the radiation. A phosphor exhibiting such properties is referred to as a stimulable phosphor.

As disclosed in U.S. Pat. No. 4,258,264 and Japanese Unexamined Patent Publication No. 56 (1981)-11395, it has been proposed to use a stimulable phosphor in a radiation image recording and reproducing system. Specifically, a sheet provided with a layer of the stimulable phosphor (hereinafter referred to as a stimulable phosphor sheet) is first exposed to a radiation passing through an object to have a radiation image of the object stored thereon, and is then scanned with stimulating rays such as a laser beam which cause the stimulable phosphor sheet to emit light in proportion t the stored radiation energy. The light emitted by the stimulable phosphor sheet when it is exposed to stimulating rays is photoelectrically detected and converted into an electric image signal, which is processed to reproduce a visible image on a recording medium such as a photographic film or on a display device such as a cathode ray tube (CRT).

The radiation image recording and reproducing system using a stimulable phosphor sheet is advantageous over conventional radiography using a silver halide photographic material in that the image can be recorded over a very wide range (latitude) of radiation exposure. More specifically, since the amount of light emitted upon stimulation after the radiation energy is stored on the stimulable phosphor sheet varies over a wide range in proportion to the amount of said stored energy, it is possible to obtain an image having desirable density regardless of the amount of exposure of the stimulable phosphor sheet to the radiation, by reading out the emitted light with an appropriate read-out gain and converting it into an electric signal by use of a photoelectric conversion means to reproduce a visible image on a recording medium such as a photographic film or a display device such as a CRT.

In the aforesaid radiation image recording and reproducing system, read-out of the radiation image is generally conducted by use of a read-out apparatus constituted so that a beam of stimulating rays deflected by a light deflector is made to scan on the stimulable phosphor sheet in a main scanning direction, and at the same time the stimulable phosphor sheet is conveyed in a sub-scanning direction approximately normal to the main scanning direction.

As the light deflector, a multi-face rotating mirror (i.e. polygon mirror) rotating at a high speed may be used. The multi-face rotating mirror is advantageous in scanning stability over other light deflectors such as a galvanometer mirror. However, for achieving high scanning stability, it is necessary to rotate the multi-face rotating mirror at a high speed. On the other hand, in order to stimulate the stimulable phosphor sheet carrying a radiation image stored thereon, it is necessary to expose the sheet to stimulating rays of comparatively high energy. However, when the multi-face rotating mirror is rotated at a high speed, the scanning speed of the beam of stimulating rays in the main scanning direction becomes high, and the level of stimulation energy which the stimulable phosphor sheet receives decreases. As a result, the level of light emitted by the stimulable phosphor sheet decreases, and the S/N ratio of a read-out image signal becomes low.

SUMMARY OF THE INVENTION

The primary object of the present invention is to provide a radiation image read-out apparatus which provides a read-out image signal with a high S/N ratio even though a beam of stimulating rays is scanned at a high speed on a stimulable phosphor sheet.

Another object of the present invention is to provide a radiation image read-out apparatus for obtaining a read-out image signal with a high S/N ratio in a simple manner even though a beam of stimulating rays is scanned at a high speed on a stimulable phosphor sheet.

The present invention provides a radiation image read-out apparatus for scanning a stimulable phosphor sheet carrying a radiation image stored thereon with a beam of stimulating rays which cause the stimulable phosphor sheet to emit light in proportion to the stored radiation energy, and photoelectrically detecting the light emitted by a stimulable phosphor sheet portion scanned with the beam of stimulating rays by use of a photodetector to obtain an image signal, wherein the improvement comprises:

(i) constituting said radiation image read-out apparatus so that the beam diameter of said beam of stimulating rays is adjusted to be smaller than a picture element size and each of the picture elements is scanned by a plurality of scanning passes with said beam of stimulating rays, and (ii) providing an addition means for adding a plurality of image signals per picture element obtained by said plurality of scanning passes.

When the beam diameter of the beam of stimulating rays is adjusted to be substantially small, the energy density of the beam becomes high. Also, when each of the picture elements is scanned by a plurality of scanning passes with the beam of stimulating rays having a small beam diameter (i.e. different portions of a single picture element are respectively scanned by different scanning passes), the total amount of light emitted per picture element becomes substantially large. Therefore, a read-out image signal obtained by adding a plurality of image signals per picture element represents the total amount of light emitted by said picture element. Thus it is possible to obtain a visible reproduced image having a high image quality with a high S/N ratio by use of the read-out image signal which is of a high level.

DESCRIPTION OF THE PREFERRED EMBODIMENTS

The present invention will hereinbelow be described in further detail with reference to the accompanying drawings.

Figure 1:
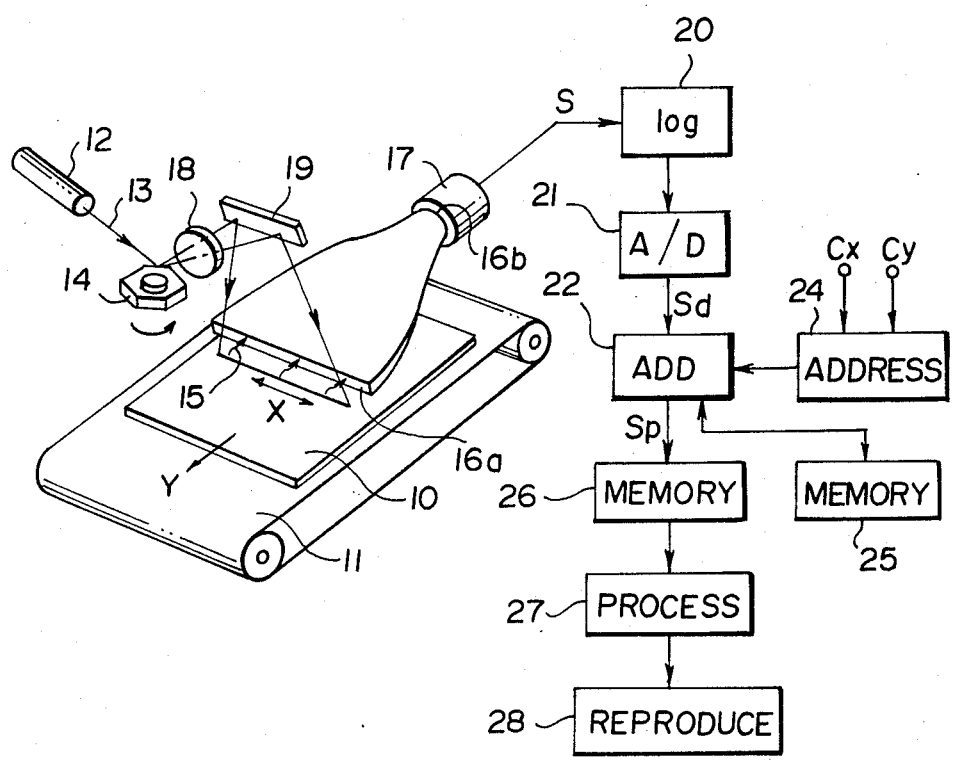
FIG. 1 is a schematic view showing an embodiment of the radiation image read-out apparatus in accordance with the present invention.

Referring to FIG. 1, a stimulable phosphor sheet 10 carrying a radiation image of an object stored thereon by being exposed to a radiation such as X-rays passing through the object such as the human body is conveyed by a sheet conveyance means 11 constituted by an endless belt or the like in a sub-scanning direction as indicated by the arrow Y. A laser beam 13 emitted as stimulating rays by a laser beam source 12 is deflected by a multi-face rotating mirror 14 which rotates at a high speed. The laser beam 13 is then converged by a converging lens 18 usually constituted by an fΘ lens, and is reflected by a mirror 19 onto the stimulable phosphor sheet 10. Thus the laser beam 13 scans the stimulable phosphor sheet 10 in a main scanning direction as indicated by the arrow X approximately normal to the sub-scanning direction as indicated by the arrow Y. When the stimulable phosphor sheet 10 is exposed to the laser beam 13, the exposed portion of the sheet 10 emits light 15 in an amount proportional to the stored radiation energy. The emitted light 15 is guided by a light guide member 16 and photoelectrically detected by a photomultiplier 17 acting as a photodetector. The light guide member is fabricated by forming a light guiding material such as an acrylic plate, and has a linear light input face 16a disposed to extend along the beam scanning line on the stimulable phosphor sheet 10, and a ring-like light output face 16b closely contacted with a light receiving face of the photomultiplier 17. The light 15 emitted by the stimulable phosphor sheet 10 and entering the light guide member 16 from its light input face 16a is guided inside of the light guide member 16 through total reflection up to the light output face 16b, and received by the photomultiplier 17. In this manner, the amount of the light 15 representing the radiation image stored on the stimulable phosphor sheet 10 is detected by the photomultiplier 17, which converts the detected light amount into an analog output signal (image signal) S.

Figure 2:
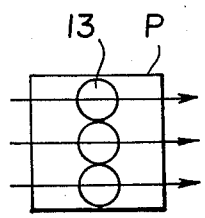
FIG. 2 is a schematic view showing an example of the shape of a beam of stimulating rays in the embodiment of FIG. 1.
Figure 3:
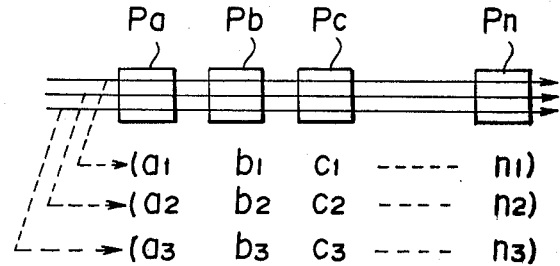
FIG. 3 is an explanatory view showing the signal addition in the embodiment of FIG. 1, FIGS. 4 and 5 are schematic views showing different examples of the shape of a beam of stimulating rays in the present invention.

The analog output signal S generated by the photomultiplier 17 is amplified by a logarithmic amplifier 20, and digitized by an A/D converter 21 with a predetermined scale factor into a digital image signal Sd. The digital image signal Sd thus obtained is sent to an addition section 22 which conducts addition processing. The addition processing will hereinbelow be described in detail. As shown in FIG. 2, the laser beam 13 is converged to a beam diameter substantially smaller than the size of a picture element P on the stimulable phosphor sheet 10. The main scanning speed and the sub-scanning speed of the laser beam 13 are adjusted to appropriate values, so that the laser beam 13 scans the single picture element P by three scanning passes in the main scanning direction (i.e. an approximately ⅓ portion of the single picture element P is scanned by each scanning pass in the main scanning direction). Therefore, as shown in FIG. 3, the digital image signal Sd comprises signals of three sets such as, for example, (a1, b1, c1, ..., n1), (a2, b2, c2, ..., n2), and (a3, b3, c3, ..., n3) for a single picture element string Pa, Pb, Pc, ..., Pn in the main scanning direction. The addition section 22 adds the signals common to each picture element as expressed by (a1+a2+a3), (b1+b2+b3), (c1+c2+c3), ..., (n1+n2+n3). The addition in the addition section 22 is conducted by creating addresses of the picture elements by an address creating section 24 which receives an X-clock pulse Cx and a Y-clock pulse Cy respectively in synchronization with the main scanning and sub-scanning of the laser beam 13, making the respective signals entered later correspond to the respective signals which have been stored at the respective addresses in a line memory 25, at the corresponding addresses, and adding the signals corresponding to each other. The addition may also be conducted by adding the signals (a2, b2, c2, ..., n2) obtained by the second main scanning pass to the signals (a1, b1, c1, ..., n1) stored in the line memory 25 to obtain sum signals (a1+a2), (b1+b2), (c1+c2), ..., (n1+n2), storing the sum signals in the line memory 25, and then adding the signals (a3, b3, c3, ..., n3) obtained by the third main scanning pass to the stored sum signals. Or, the signals (a1, b1, c1, ..., n1), (a2, b2, c2, n2), and (a3, b3, c3, ..., n3) obtained by three main scanning passes may be stored in the line memory 25, and the addition may be conducted after the three main scanning passes are finished. Instead of the line memory 25, a frame memory capable of storing the image signals over the whole surface of the stimulable phosphor sheet 10 may be used. However, when the signals are added each time one main scanning pass is conducted as mentioned above, it is possible to employ a line memory having a small capacity for signals of one or two lines.

The sum signals (a1+a2+a3), (b1+b2+b3), (c1+c2+c3), ..., (n1+n2+n3) are stored as read-out image signals Sp respectively at the picture elements Pa, Pb, Pc, ..., Pn in a large-capacity memory 26 constituted by an optical disk, a magnetic disk, or the like. In the same manner, sum signals at picture element strings following the picture element string Pa, Pb, Pc, ..., Pn are stored in the memory 26, and thus the read-out image signals Sp detected over the whole surface of the stimulable phosphor sheet 10 are stored in the memory 26.

In the above example, the signal obtained after logconverted by the logarithmic amplifier 20 is added. However, it is possible to antilog-convert the log-converted signal to an anti-logarithm and add the signal of the anti-logarithm so that the amount of the emitted light itself may be added, and log-convert the signal again after the addition. That is, in case of signals a1, a2, a3 of the picture element Pa, for instance, a signal of $$\log (10^{a_1} + 10^{a_2} + 10^{a_3})$$

may be made the image read-out signal for the picture element Pa.

In order to reproduce the radiation image stored on the stimulable phosphor sheet 10, the read-out image signals Sp are read from the large-capacity memory 26 and sent to an image reproducing apparatus 28 constituted by a CRT, a light beam scanning recording apparatus or the like, via an image processing device 27. At the image reproducing apparatus 28, the radiation image stored on the stimulable phosphor sheet 10 is reproduced as a visible image.

With the aforesaid embodiment, since the beam diameter of the laser beam 13 as stimulating rays is adjusted to be substantially smaller than the size of the picture element P, the energy density of the laser beam 13 becomes substantially high. Also, since different portions of each picture element P are scanned by different scanning passes with the laser beam 13 having substantially high energy density, the total amount of light emitted per picture element becomes substantially high. Therefore, the read-out image signals Sp obtained by conducting the addition as mentioned above are of a high level corresponding to the total amount of light emitted per picture element. When the read-out image signals Sp of a high level are used, it is possible to reproduce a visible image of a high image quality with a high S/N ratio at the image reproducing apparatus 28.

Figure 4:
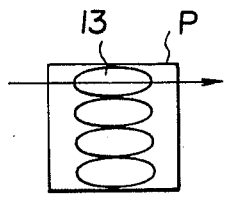
Figure 5:
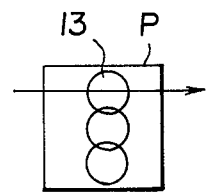

The number of scanning passes per picture element with the beam of stimulating rays is not limited to three, and may be two or four or more. In this case, the beam diameter of the beam of stimulating rays may be adjusted to an appropriate value in accordance with the number of scanning passes per picture element and the size of the picture element. Also, the shape of the beam of stimulating rays (i.e. the laser beam 13) is not limited to the one shown in FIG. 2, and may be comparatively flat in the main scanning direction as shown in FIG. 4. As shown in FIG. 5, the diameter of the beam of stimulating rays may be adjusted so that spots scanned by adjacent main scanning passes overlap partially.

Figure 6:
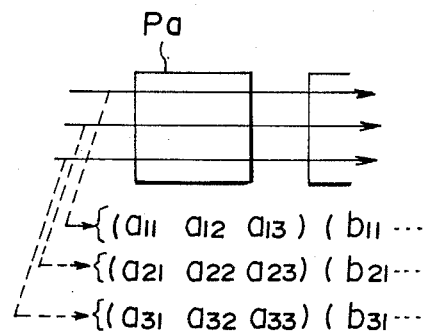
FIG. 6 is an explanatory view showing another example of the signal addition system in the present invention.

Also, as shown in FIG. 6, the image signals may be sampled at a plurality of (three, in this example) sampling points per picture element in the main scanning direction, and the image signals detected in the main scanning direction and in the sub-scanning direction may be added as expressed by $$1 \leq \sum_{i,j} \leq 3a_{ij}.$$

We claim:

1. A radiation image read-out apparatus for scanning a stimulable phosphor sheet carrying a radiation image stored thereon with a beam of stimulating rays which cause the stimulable phosphor sheet to emit light in proportion to the stored radiation energy, and photoelectrically detecting the light emitted by a stimulable phosphor sheet portion scanned with the beam of stimulating rays by use of a photodetector to obtain an image signal, wherein the improvement comprises:
  (i) means for adjusting the beam diameter of said beam of stimulating rays such that the beam diameter is smaller than a picture element size, and means for scanning each of the picture elements by a plurality of scanning passes with said beam of stimulating rays, and
  (ii) an addition means for adding a plurality of image signals per picture element obtained by said plurality of scanning passes.

2. An apparatus as defined in claim 1 wherein said addition means is connected to an address creating section for receiving clock pulses in synchronization with the scanning in a main scanning direction and clock pulses in synchronization with the scanning in a sub-scanning direction and creating addresses of said picture elements.

3. An apparatus as defined in claim 2 wherein said addition means is connected to a memory for storing, at respective addresses, at least the image signals detected at respective picture elements by an original scanning pass in the main scanning direction, wherein the addition means adds image signals at the same address.

4. An apparatus as defined in claim 1 wherein said addition means is connected to a large-capacity memory for storing sum image signals obtained by the addition conducted by said addition means.

5. An apparatus as defined in claim 1 wherein the means are provided for sampling image signals at a plurality of sampling points per picture element during each scanning pass in a main scanning direction, and said addition means adds said image signals detected per picture element in the main scanning direction and in the subscanning direction approximately normal to the main scanning direction.

6. An apparatus as defined in claim 1 wherein said beam of stimulating rays is a laser beam.

* * * * *